US008318363B2

(12) United States Patent
Lim

(10) Patent No.: US 8,318,363 B2
(45) Date of Patent: Nov. 27, 2012

(54) REFORMER FOR FUEL CELL SYSTEM AND FUEL CELL SYSTEM COMPRISING THE SAME

(75) Inventor: Hyun-Jeong Lim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1322 days.

(21) Appl. No.: 11/155,038

(22) Filed: Jun. 17, 2005

(65) Prior Publication Data

US 2005/0284022 A1 Dec. 29, 2005

(30) Foreign Application Priority Data

Jun. 29, 2004 (KR) .................. 10-2004-0049416

(51) Int. Cl.
*H01M 8/00* (2006.01)
*H01M 8/06* (2006.01)
(52) U.S. Cl. .................. 429/412; 429/408; 429/410
(58) Field of Classification Search .................. 422/129; 429/12–46
See application file for complete search history.

(56) References Cited

U.S. PATENT DOCUMENTS

| 5,316,747 | A | * | 5/1994 | Pow et al. ...................... 423/247 |
| 5,427,601 | A | * | 6/1995 | Harada et al. .................... 75/235 |
| 5,858,314 | A | * | 1/1999 | Hsu et al. ....................... 422/211 |
| 6,238,815 | B1 | * | 5/2001 | Skala et al. ..................... 429/424 |
| 2002/0071797 | A1 | * | 6/2002 | Loffler et al. .................. 422/190 |
| 2003/0161785 | A1 | * | 8/2003 | Dieckmann .................... 423/650 |
| 2005/0193628 | A1 | | 9/2005 | Kim et al. |

FOREIGN PATENT DOCUMENTS

| JP | 7-211333 | 8/1995 |
| JP | 10-208759 | 8/1998 |
| JP | 10-236802 A | 9/1998 |
| JP | 2001-023671 A | 1/2001 |
| JP | 2001-023672 A | 1/2001 |
| JP | 2001-226104 A | 8/2001 |
| KR | 10-2005-0088789 | 9/2005 |

OTHER PUBLICATIONS

Patent Abstracts of Japan, Publication No. 07-211333, dated Aug. 11, 1995, in the name of Yasuyuki Harufuji.
Patent Abstracts of Japan, Publication No. 10-208759, dated Aug. 7, 1998, in the name of Mineo Komoda et al.

* cited by examiner

*Primary Examiner* — Barbara Gilliam
*Assistant Examiner* — Steven Scully
(74) *Attorney, Agent, or Firm* — Christie, Parker & Hale, LLP

(57) ABSTRACT

A reformer for a fuel cell and a fuel cell system including the same are shown. The reformer includes a heat source for providing heat to evaporate a mixed fuel and having a predetermined flow path length through which the mixed fuel passes and a catalyst layer lining the internal surface of the flow path, and a reforming reactor for generating hydrogen gas from the mixed fuel through a chemical catalytic reaction by the heat and having a predetermined flow path length through which the mixed fuel passes and a catalyst layer lining the internal surface of the flow path. Either the heat source, or the reforming reactor, or both are formed from an alloy of a barrier layer forming metal and a mechanical strength enhancing metal.

9 Claims, 3 Drawing Sheets

REFORMER FOR FUEL CELL SYSTEM AND FUEL CELL SYSTEM COMPRISING THE SAME

CROSS REFERENCE TO RELATED APPLICATION

This application claims priority to and the benefit of Korean Patent Application No. 10-2004-0049416 filed in the Korean Intellectual Property Office on Jun. 29, 2004, the entire content of which is incorporated herein by reference.

FIELD OF THE INVENTION

The present invention relates to a reformer for a fuel cell system where either a heat source, or a reforming reactor, or both are formed of an alloy of a barrier layer forming metal and a mechanical strength enhancing metal in order to improve welding characteristics and adhesion to a catalyst by forming an oxide film. The present invention also encompasses a fuel cell system including the reformer.

BACKGROUND OF THE INVENTION

A typical fuel cell is a power generation system for producing electrical energy through a chemical reaction of oxygen and hydrogen contained in a hydrocarbon-based material such as methanol, ethanol, or natural gas. High specific energy of organic fuel, for example 6232 Wh/kg for methanol, renders the fuel cells attractive.

Fuel cells may be divided into the categories of alkaline cells, phosphoric acid cells, fused carbonate cells, solid oxide cells, or polymer electrolyte cells depending upon the type of electrolyte used in the cell. Polymer electrolyte membrane fuel cells (PEMFC) are a variety of polymer electrolyte cells. Compared to conventional fuel cells, the PEMFCs have superior power characteristics, lower operating temperatures, and faster start and response characteristics. As a result, the PEMFCs have a wide range of applications and can be used as transportable power sources for automobiles, distributed power sources for residences and public buildings, or small power sources for electronic devices.

A PEMFC essentially includes a stack, a reformer, a fuel tank, and a fuel pump. The stack forms the body of the PEMFC and the fuel pump provides the fuel stored in the fuel tank to the reformer. The reformer reforms the fuel to generate hydrogen gas and supplies the hydrogen gas to the stack, where hydrogen reacts with oxygen in an electrochemical reaction to generate electrical energy.

Alternatively, a fuel cell may be a direct methanol fuel cell (DMFC) in which liquid methanol fuel is directly introduced into the stack. Unlike a PEMFC, a DMFC does not require a reformer.

In the fuel cell system described above, the stack for generating the electricity may have several unit cells stacked adjacent to one another. Each unit cell includes a membrane-electrode assembly (MEA) and a separator, also referred to as a "bipolar plate." The MEA includes an anode that is also referred to as a "fuel electrode" or an "oxidation electrode," and a cathode that is also referred to as an "air electrode" or a "reduction electrode." The anode and the cathode of an MEA are separated by polymer electrolyte membranes. The separators function both as channels, for supplying the fuel and the oxygen required for a reaction to the anode and the cathode, and as conductors, for serially coupling the cathode and the anode in the MEA, or for coupling the cathode of one MEA to the anode of a neighboring MEA. The electrochemical oxidation of the fuel occurs on the anode, and the electrochemical reduction of the oxygen occurs on the cathode. As a result of the transfer of the electrons generated by the oxidation/reduction reactions, electrical energy, heat, and water are produced.

A reformer used in a PEMFC system reforms and transforms water and a fuel containing hydrogen into the hydrogen gas needed to produce electricity in a stack. The reformer also removes substances such as carbon monoxide which poison a fuel cell and shorten its life. A conventional reformer includes a reforming reactor for reforming the fuel, and a carbon monoxide remover or a carbon monoxide reducer. The reforming reactor transforms the fuel into a reformed gas with abundant hydrogen through a catalytic reaction such as steam reformation, partial oxidation, or autothermal reformation. The carbon monoxide remover removes carbon monoxide from the reformed gas through catalytic reactions such as water-gas shift (WGS) or preferential oxidation (PROX), or by hydrogen purification using a separation membrane.

As described above, the conventional reformer generates hydrogen gas from the hydrogen-containing fuel through a chemical catalytic reaction using heat energy. Typically, the reformer includes a heat source for generating the heat energy, a reforming reactor for generating hydrogen gas from the fuel using the heat energy, and a carbon monoxide remover for reducing the level of carbon monoxide included with the hydrogen gas.

In the reformer of a conventional fuel cell system, the reforming reactor has a catalytic reformation layer for reforming a mixed fuel obtained by mixing liquid-phase fuel with water. Through a catalytic reforming reaction in the catalytic reformation layer, the reforming reactor can generate a reformed gas with abundant hydrogen from the mixed fuel that is heated to a certain predetermined temperature.

SUMMARY OF THE INVENTION

In order to improve the processes described above, embodiments of the present invention provide a reformer for a fuel cell system that has improved welding characteristics by using an alloy of a metal that is capable of forming a barrier layer and a metal that is capable of enhancing mechanical strength and improving adhesion between a substrate and a catalyst by forming an oxide film. A metal capable of forming a barrier layer will be referred to as barrier layer forming metal and a metal capable of enhancing mechanical strength will be referred to as a mechanical strength enhancing metal.

Embodiments of the present invention also include a fuel cell system using the reformer described by the invention.

Embodiments of the present invention provide a reformer for a fuel cell for generating a hydrogen-rich reformed gas with abundant hydrogen by reforming a mixed fuel obtained by mixing water with a liquid-phase fuel including hydrogen. The reformer includes a heat source, for providing heat to evaporate the mixed fuel, and has a predetermined flow path length through which the mixed fuel passes. The reformer also includes a catalyst layer formed on the internal surface of the flow path, and a reforming reactor for generating hydrogen gas from the mixed fuel through a chemical catalytic reaction assisted by heat. The flow path of the mixed fuel has a predetermined length through which the mixed fuel passes. The heat source, or the reforming reactor, or both may be formed of an alloy of a barrier layer forming metal and a mechanical strength enhancing metal.

A fuel cell system that includes a stack for generating electricity through an electrochemical reaction of a fuel and an oxidant, a reformer for generating hydrogen gas by evaporating a mixed fuel obtained by mixing water with a liquid-phase fuel including hydrogen and reforming the evaporated mixture, a fuel supplier for supplying the mixed fuel to the reformer, and an oxidant supplier for supplying atmospheric air to the stack are also presented. The reformer includes a heat source for providing heat to evaporate the mixed fuel and has a flow path of a predetermined length through which the mixed fuel passes. A catalyst layer is formed on the internal surface of the flow path lining the flow path. The fuel cell system also includes a reforming reactor for generating hydrogen gas from the mixed fuel through a chemical catalytic reaction caused by heat and having a flow path of a predetermined length through which the mixed fuel passes and also having a catalyst layer formed on the internal surface of the flow path lining this surface. At least one of the heat source and the reforming reactor is formed of an alloy of a barrier layer forming metal and a mechanical strength enhancing metal.

DETAILED DESCRIPTION

Figure 1:
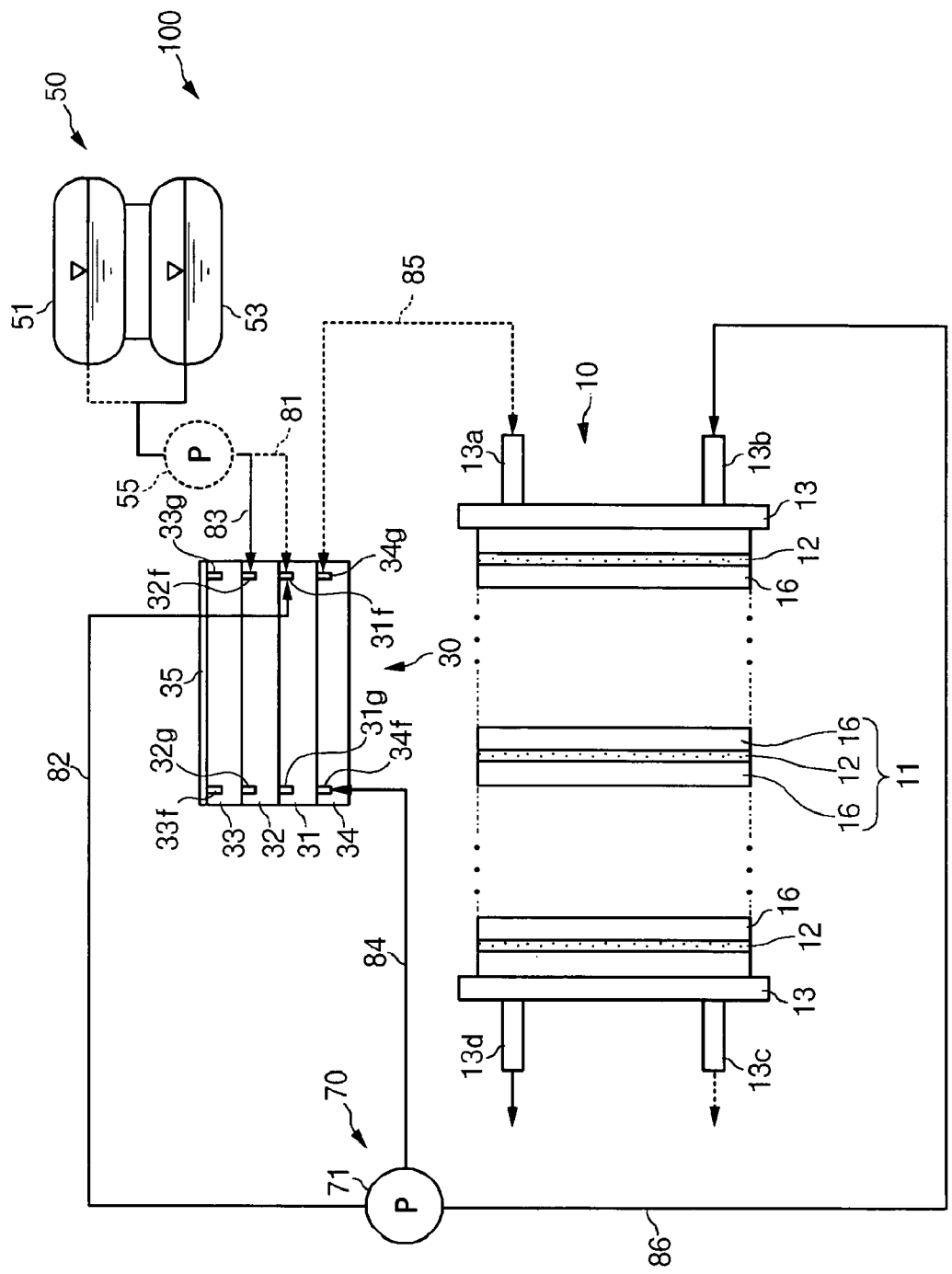
FIG. 1 is a schematic view illustrating the structure of a fuel cell system in accordance with an embodiment of the present invention.

FIG. 1 is a schematic view illustrating the structure of a fuel cell system in accordance with one embodiment of the present invention. In the fuel cell system 100, the fuel for generating electricity is a fuel containing hydrogen, such as methanol, ethanol, and natural gas. For convenience, the embodiments disclosed herein refer to a liquid-phase fuel containing hydrogen such as methanol, but the invention is not limited to just liquid-phase fuels. Further, the phrase "mixed fuel" will signify a mixture of water and the liquid-phase fuel.

The fuel cell system 100 of the present invention can use pure oxygen gas, which is separately stored, or it can use the atmospheric oxygen in air for reaction with the hydrogen contained in the fuel. The embodiments explained below assume that the fuel cell system 100 uses the atmospheric oxygen as opposed to pure oxygen, but the invention is not limited to just using air as the oxidant.

Referring to FIG. 1, the fuel cell system 100 of the present invention includes a reformer 30 for generating hydrogen gas by reforming the mixed fuel, a stack 10 for generating electricity by converting the energy of a chemical reaction of oxidant and the hydrogen gas generated in the reformer 30 into electric energy, a fuel supplier 50 for supplying the mixed fuel to the reformer 30, and an air supplier 70 for supplying atmospheric oxygen from the outside to the stack 10.

The fuel cell system suggested in the present invention adopts the PEMFC method which generates the hydrogen gas in the reformer 30 and generates the electric energy through an electro-chemical reaction of hydrogen and oxidant by supplying the hydrogen gas to the stack 10.

The fuel supplier 50 is coupled with the reformer 30. The fuel supplier 50 includes a first tank 51 for storing the liquid-phase fuel and a second tank 53 for storing water. The first and the second tanks 51, 53 are coupled to each other by an optional fuel pump 55. The fuel supplier 50 and the reformer 30 may be coupled to each other by a first supply line 81 and a third supply line 83.

The air supplier 70 is coupled to the stack 10 and it is provided with an air pump 71 for providing air to the stack 10 with a predetermined pumping force. The stack 10 and the air supplier 70 can be coupled to each other by a sixth supply line 86.

In the embodiment being discussed, the reformer 30 includes a heat source 31 for generating combustion heat by inducing a catalytic oxidation combustion between the liquid-phase fuel and air and a reforming reactor 32 for generating hydrogen gas by reforming the mixed fuel. Also, the reformer 30 may include at least one carbon monoxide remover 33, 34 to actively remove carbon monoxide from the hydrogen gas.

Figure 2:
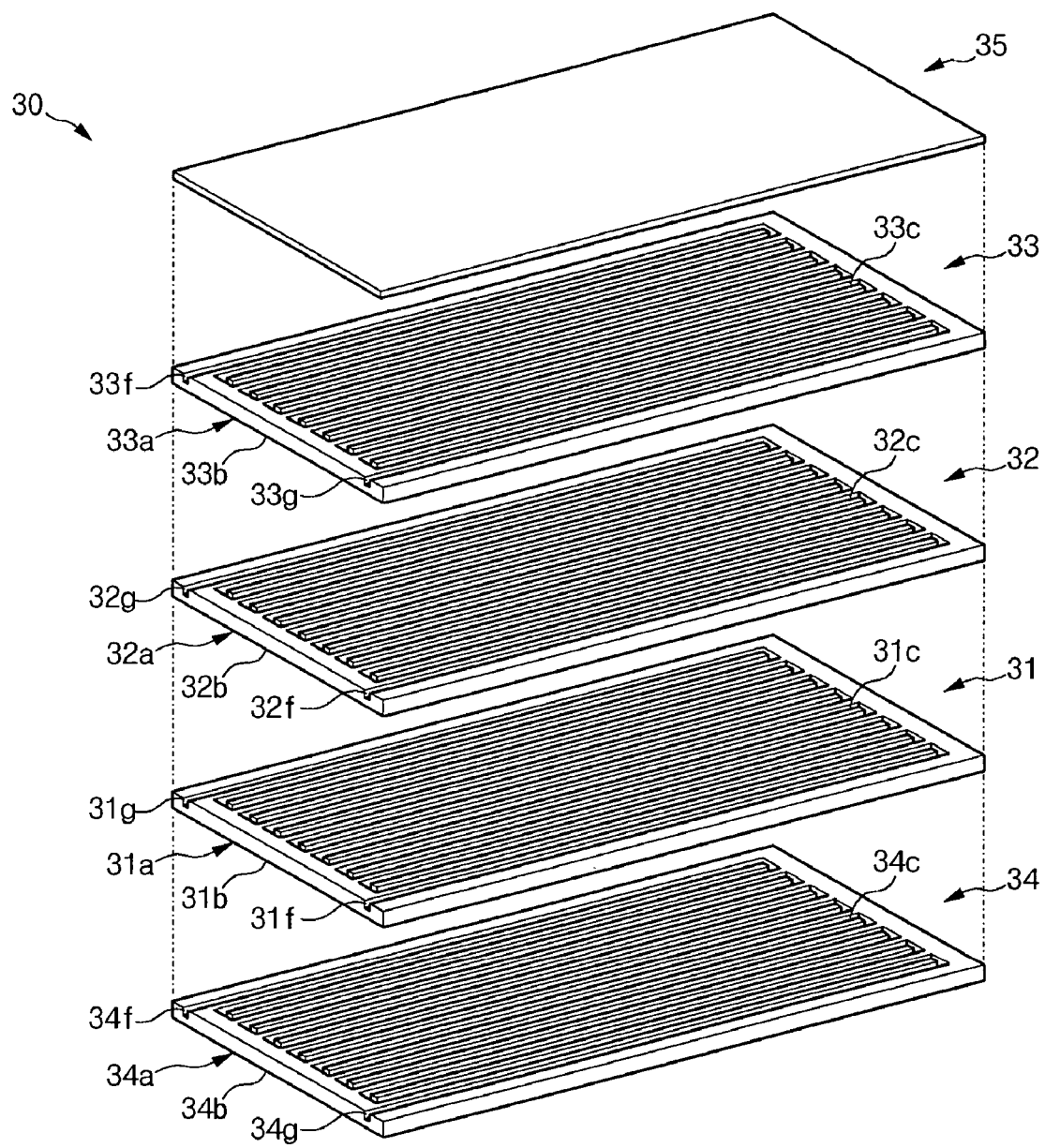
FIG. 2 is an exploded perspective view describing the essential parts of the reformer shown in FIG. 1.

FIG. 2 is an exploded perspective view showing a part of the reformer 30 shown in FIG. 1. Referring to FIGS. 1 and 2, the reformer 30 used in the present invention can generate hydrogen gas by reforming the mixed fuel through a conventional catalytic chemical reaction using heat energy. Additionally, the reformer 30 can reduce the concentration of carbon monoxide contained in the hydrogen gas. The reformer 30 generates hydrogen gas from the liquid-phase fuel through a catalytic reaction such as steam reformation, partial oxidation, or autothermal reaction. The reformer 30 can reduce the concentration of the carbon monoxide contained in the hydrogen gas through a catalytic reaction such as a WGS reaction or a PROX reaction, or through hydrogen purification using a separation membrane.

In the reformer 30 of the fuel cell system 100, a flow path, through which the mixed fuel passes, includes an inlet for admitting the mixed fuel obtained by mixing water with a liquid-phase fuel containing hydrogen, and an outlet for exhausting the hydrogen-rich reformed gas generated through the reforming reaction.

The reformer 30 includes the heat source 31, for generating the heat needed for the catalytic chemical reaction, and the reforming reactor 32 for evaporating the mixed fuel by absorbing the heat generated in the heat source 31 and generating hydrogen gas from the evaporated mixed fuel through a stream reformation catalytic reaction. The reformer 30 may include at least one carbon monoxide remover 33, 34 for reducing the concentration of carbon monoxide included with the hydrogen gas. For example, a first carbon monoxide remover 33 primarily reduces the concentration of the carbon monoxide included with the hydrogen through a WGS catalytic reaction. A second carbon monoxide remover 34 secondarily reduces the concentration of the carbon monoxide included with the hydrogen gas through a PROX catalytic reaction.

The reformer 30 of the present invention can be divided into a heat emitting portion and a heat absorbing portion. The heat source 31 belongs to the heat emitting portion that generates combustion heat by inducing a catalytic oxidation reaction between the fuel and oxygen. On the other hand, the reforming reactor 32 belongs to the heat absorbing portion that generates hydrogen gas by receiving the combustion heat and inducing a catalytic reforming reaction of the fuel. The heat emitting portion provides heat required for steam reformation by increasing the temperature of the reformer 30.

In the present embodiment, the heat source 31, the reforming reactor 32, and the carbon monoxide removers 33, 34 of the reformer 30 are shaped like plates that are stacked against one another. The reformer 30 is formed by stacking the reforming reactor 32 and a first carbon monoxide remover 33 sequentially in the upper part of the heat source 31 and stacking a second carbon monoxide remover 34 in the lower part of the heat source 31. The upper surface of the first carbon monoxide remover 33, which is placed on top of the reformer 30 may be connected to a cover 35.

The present embodiment shows an example of a reformer 30 that does not include an evaporator and evaporates the mixed fuel in the reforming reactor 32 by using the heat energy generated in the heat source 31. In an alternative embodiment, however, the reformer 30 may include an evaporator (not shown) between the heat source 31 and the reforming reactor 32, for evaporating the mixed fuel by using the heat energy generated in the heat source 31.

In the reformer 30, the heat source 31 is for generating the heat energy needed to generate hydrogen gas. The heat source 31 includes a reaction substrate 31a that burns liquid-phase fuel and air through a catalytic oxidation reaction. For combustion of the liquid-phase fuel and air, the reaction substrate 31a has a body 31b and a flow path channel 31c for allowing the fuel and the air to flow through. A catalyst layer lines the flow path channel 31c. The catalyst layer includes a typical oxidation catalyst layer which promotes the oxidation reaction between the fuel and air. A supporting layer for the catalyst layer lies between the internal surface of the flow path channel 31c and the catalyst layer. The flow path channel 31c has a starting end and a terminating end on one side of the body 31b. For example, an inlet 31f for receiving the liquid-phase fuel and air is formed at the starting end, and an outlet 31g for producing a combustion gas obtained from the combustion reaction between the liquid-phase fuel and air is formed at the terminating end. The inlet 31f and the first tank 51 of the fuel supplier 50 are coupled by the first supply line 81. The inlet 31f and the air pump 71 of the air supplier 70 may be coupled by a second supply line 82.

The reforming reactor 32 includes a reaction substrate 32a which evaporates the mixed fuel by absorbing the heat generated in the heat source 31, and generates hydrogen gas from the evaporated mixed fuel through a steam reformation (SR) catalytic reaction. For the generation of the hydrogen gas, the reaction substrate 32a has a body 32b and a flow path channel 32c for allowing the mixed fuel to flow through. The flow path channel 32c may be lined with a catalyst layer. The catalyst layer includes a typical reformation catalyst which promotes the SR reaction of the mixed fuel. There is a supporting layer for supporting the catalyst layer between the internal surface of the flow path channel 32c and the catalyst layer. The flow path channel 32c has a starting end and a terminating end on one side of the body 32b. For example, an inlet 32f for receiving the mixed fuel is formed at the starting end, and an outlet 32g for producing the hydrogen gas generated from the mixed fuel is formed at the terminating end. The inlet 32f, the first tank 51, and the second tank 53 of the fuel supplier 50 can be coupled by the third supply line 83, and the inlet 32f can be coupled to the outlet 31g of the heat source 31 through a separate pipeline (not shown).

The first carbon monoxide remover 33 includes a reaction substrate 33a which generates hydrogen gas in addition to the hydrogen gas generated in the reforming reactor 32, through a WGS catalytic reaction and also primarily reduces the concentration of the carbon monoxide included in the hydrogen gas. To generate the additional hydrogen gas and to reduce the level of carbon monoxide, the reaction substrate 33a has a flow path channel 33c for allowing the hydrogen gas generated in the reforming reactor 32 flow and a body 33b provided with a catalyst layer formed inside and lining the flow path channel 33c. The catalyst layer includes a typical water-gas shifting catalyst layer which promotes the WGS reaction of the hydrogen gas. For supporting the catalyst layer, there is a supporting layer between the internal surface of the flow path channel 33c and the catalyst layer. The flow path channel 33c has a starting end and a terminating end on one side of the body 33b. For example, an inlet 33f for receiving the hydrogen gas is formed at the starting end, and an outlet 33g for producing hydrogen gas whose carbon monoxide concentration is primarily reduced is formed at the terminating end. The inlet 33f of the first carbon monoxide remover 33 can be coupled to the outlet 32g of the reforming reactor 32 through a separate connector, such as a pipeline and a penetrating opening.

The second carbon monoxide remover 34 includes a reaction substrate 34a which secondarily reduces the concentration of carbon monoxide included in the hydrogen gas through a PROX catalytic reaction between air and the hydrogen gas discharged from the first carbon monoxide remover 33. To secondarily reduce the level of the carbon monoxide, the reaction substrate 34a has a body 34b and a flow path channel 34c for allowing the hydrogen gas to flow through that is lined with a catalyst layer. The catalyst layer includes a typical preferential oxidation catalyst layer which promotes preferential oxidation reaction of the hydrogen gas. There is a supporting layer for supporting the catalyst layer between the internal surface of the flow channel 34c and the catalyst layer. The flow path channel 34c has a starting end and a terminating end on one side of the body 34b. For example, an inlet 34f for receiving the hydrogen gas is formed at the starting end, and an outlet 34g for producing the hydrogen gas whose carbon monoxide concentration is secondarily reduced is formed at the terminating end. The inlet 34f and the air pump 71 of the air supplier 70 can be coupled to each other by a fourth supply line 84. The outlet 34g can be coupled to the stack 10 through a fifth supply line 85. In addition, the inlet 34f of the second carbon monoxide remover 34 and the outlet 33g of the first carbon monoxide remover 33 can be coupled to each other by a separate connector, such as a pipeline and a penetrating opening.

The reformer 30 of the current invention is a micro-reformer. A micro-reformer can have improved welding characteristics compared to a reformer formed from pure Al, when at least either of the reaction substrates 31a, 32a of the heat source 31 or the reforming reactor 32 are formed of an alloy of a metal that is capable of forming a barrier layer and a metal that is capable of enhancing mechanical strength. The barrier layer forming metal is a metal that can form an effective protection film through anodization. The barrier layer forming metal includes at least one metal selected from the group consisting of Al, Ti, Zn and Zr. The mechanical strength enhancing metal includes at least one metal selected from the group consisting of Fe, Ni, Mn, and Mg.

For example, at least one of the reaction substrates 31a, 32a, 33a, 34a and the bodies 31b, 32b, 33b, 34b that form the reformer 30 may be formed of an alloy of Al and Fe. In one embodiment, all of them are formed of an alloy of Al and Fe. If at least one of the reaction substrates 31a, 32a, 33a, 34a is formed from an alloy of Al and Fe, the others may be formed from any material selected from the group consisting of silicone, glass, and stainless steel. Also, in one embodiment, an alloy containing a minute quantity of Cr in addition to the Al and Fe can be used.

The alloy ratio of the barrier layer forming metal to the mechanical strength enhancing metal may vary in the weight range of 10:90 to 90:10. An alloy ratio of less than 10:90 makes it difficult to form a catalyst supporting layer which includes an amorphous oxide such as alumina. On the other end of the spectrum, an alloy ratio exceeding 90:10 degrades the mechanical strength of the reforming reactor.

In one embodiment, the alloy of the barrier layer forming metal and the mechanical strength enhancing metal is an alloy of Al and Fe, and in another embodiment, both the heat source 31 and the reforming reactor 32 are formed from an alloy of Al and Fe. The alloy ratio of Al to Fe is in the range of 10:90 to 90:10 by weight.

The flow path channel 31c which is formed in the heat source 31 can be formed through a conventional method. The supporting layer between the internal surface of the flow path channel 31c and the catalyst layer supports the catalyst layer. In one embodiment, a noble metal, e.g., Pt or Ru, may be used for the catalyst of the heat source 31. The reforming reactor 32 may include the flow path channel 31c formed by a conventional method. The internal surface of the flow path channel 31c can include a supporting layer and a catalyst layer. In various embodiment, the catalyst for the reforming reactor may be formed of Zn, Fe, Cr, Cu, Ni, Rh, Cu/Zn, and the like. If both the heat source and the reforming reactor are formed of an alloy of Al and Fe in the present invention, the catalyst supporting layer, which is an alumina film, can be formed through oxidation without going through a process for forming the catalyst supporting layer. Also, if at least one of the heat source 31 and the reforming reactor 32 is formed of an alloy of Al and Fe, the catalyst supporting layer, which is the alumina film, can be formed by oxidation as well, even if the process for forming the catalyst supporting layer is not carried out. The other of the two may also include a supporting layer formed of any one selected from the group consisting of alumina, silica, and titania.

The reformer 30 including the heat source 31 and the reforming reactor 32 may be in the shape of a box having a predetermined length, width, and thickness, or in the shape of a tube with a circular cross-section. The shape of the reformer 30 is not limited to a box or a tube however. The reformer 30 for the fuel cell system 100 may also have an integrated shape formed by welding the heat source 31 to the reforming reactor 32. The bodies 31b, 32b, 33b, 34b of the reaction substrates 31a, 32a, 33a, 34a, may be shaped as rectangular plates having a predetermined width and length. However, the shape of the bodies 31b, 32b, 33b, 34b is not limited to a rectangular plate and may take a variety of forms.

The heat source 31 and the reforming reactor 32 are stacked next to each other in the reformer 30 of FIG. 2. The reformer 30 may be formed by welding the heat source 31 and the reforming reactor 32 together leaving openings reserved for the flow path channels 31c, 32c. After the ceramic catalyst is loaded, adhesion between the ceramic catalyst and its substrate is improved by thermally treating the reformer 30 at a high temperature in an oxygen atmosphere to form an amorphous oxide layer in the flow path channels 31c, 32c. In one embodiment, a catalyst supporting layer including alumina generated by oxidation of Al is also formed in the flow path channels 31c, 32c. Although no specific conditions are required for the thermal treatment, in one embodiment, the thermal treatment may be carried out at a temperature of 400° C. to 800° C. and preferably at 600° C. In short, the flow path channels 31c, 32c of the heat source 31 and the reforming reactor 32 undergo thermal treatment at a high temperature and the thermal treatment is capable of generating an amorphous oxide layer for supporting the catalyst.

Thus, in one embodiment, the reformer 30 may be formed by welding the parts except where reserved for the flow path channels 31c, 32c, 33c, 34c and by heat treatment at a high temperature in an oxygen atmosphere.

The embodiments of the present invention are not limited to those shown in FIGS. 1 and 2 where the reformer 30 has a stack-type structure having the heat source 31, the reforming reactor 32, and the first and second carbon monoxide removers 33, 34 stacked against one another. According to a first exemplary alternative, the reformer 30 has a structure where the heat source 31 and the reforming reactor 32 are stacked together. According to a second exemplary alternative, the reformer 30 may include the heat source 31, the reforming reactor 32, and any one of the first and second carbon monoxide removers 33, 34 stacked together. According to a third exemplary alternative, the reformer 30 can include a conventional heater, such as a burner, in the heat source 31. Furthermore, in the first and third alternatives, the heat source 31 can be placed below the reforming reactor 32, and the cover 35 can be placed above the upper surface of the reforming reactor 32 and adjacent to it. In the second alternative, the reforming reactor 32 may be located above the heat source 31 and any one of the first and second carbon monoxide removers 33, 34 may be located below the heat source 31. In this alternative, the cover 35 can be connected to the upper surface of the reforming reactor 32. The carbon monoxide removers 33, 34 can be stacked with the heat source 31 and the reforming reactor 32, or can be separately coupled to the outlet 32g of the reforming reactor 32.

In addition to the heat source 31 and the reforming reaction 32, the reformer 30 may further include a combustion reactor body with a catalyst layer formed on the internal surface of the flow path and producing heat to evaporate the mixed fuel.

Also, in the reformer 30 of the fuel cell system 100, the heat source 31 can further include a heating unit that is in contact and thermally coupled with the flow path channels 31c, 32c, 33c, 34c and that heats the flow path channels 31c, 32c, 33c, 34c. The heating unit includes a heating plate that contacts the flow path channels 31c, 32c, 33c, 34c and a heating wire set up inside the heating plate. In one embodiment, the heating plate may include a groove which is matched with the flow path channels 31c, 32c, 33c, 34c in shape. The flow path channels 31c, 32c, 33c, 34c can be formed in a zigzag shape.

Figure 3:
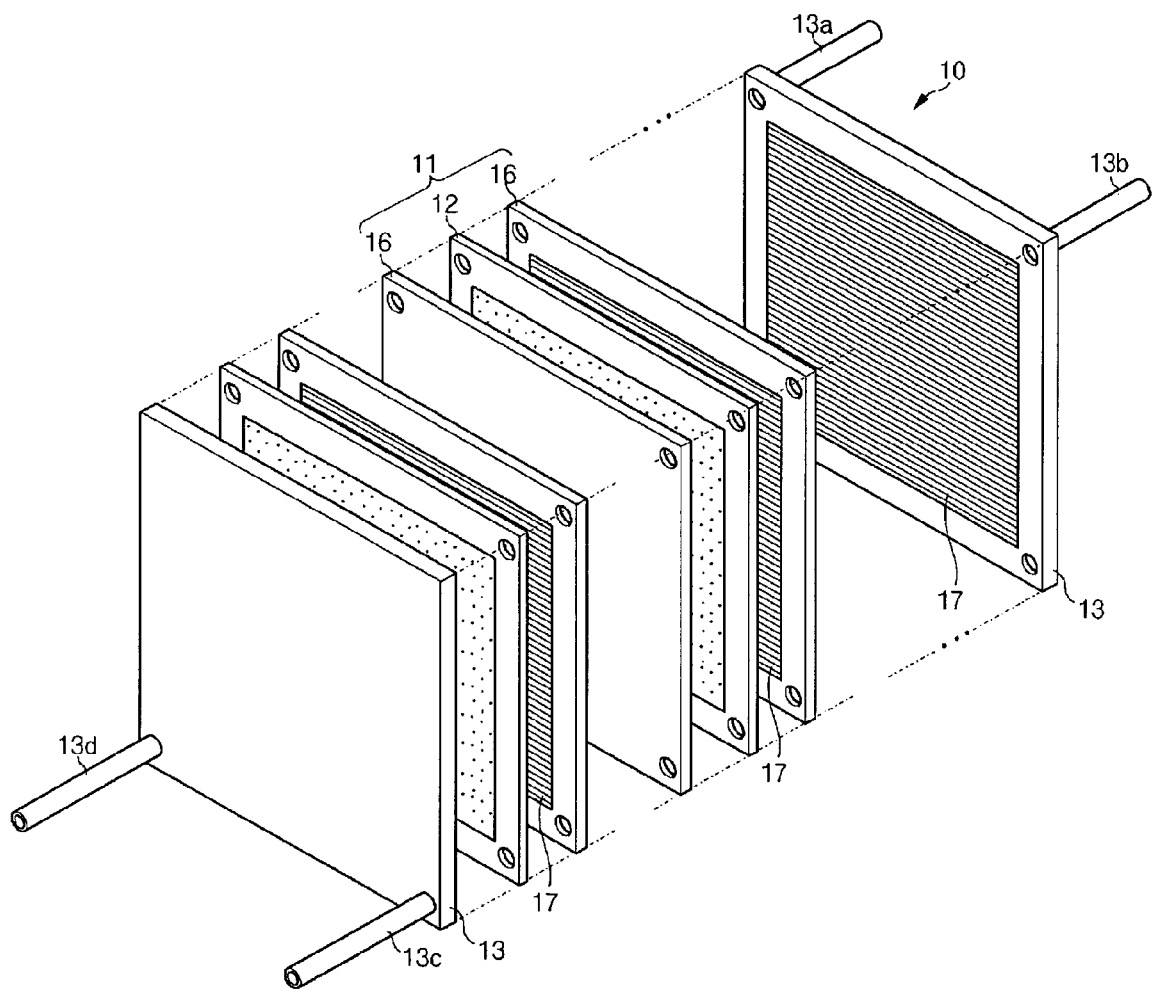
FIG. 3 is an exploded perspective view showing the structure of the stack shown in FIG. 1.

FIG. 3 is an exploded perspective view of the stack shown in FIG. 1. Referring to FIGS. 1 to 3, the stack 10 used in the fuel cell system 100 of the present invention includes at least one power generating unit 11 for generating electric energy through an oxidation reaction of hydrogen gas generated in the reformer 30 and reduction reaction of oxidant.

The power generating unit 11 is a unit cell that generates electricity. The power generating unit 11 includes a MEA 12, for oxidizing/reducing the reformed gas and the oxygen in the air, and separators 16 for supplying the reformed gas and air to the MEA 12.

In the power generating unit 11, the separators 16 are placed on both sides of the MEA 12. The stack 10 is formed by stacking a plurality of power generating units 11 next to one another. Among the separators 16, those placed in the outermost sides of the stack 10 are defined as end plates 13.

The MEA 12 has a typical membrane electrode assembly structure where an electrolyte membrane is located between an anode and a cathode that form the two sides. The anode is provided with the reformed gas through the separators 16. The anode is composed of a catalyst layer for transforming the reformed gas into electrons and protons through an oxidation reaction, and a gas diffusion layer (GDL) for free transfer of the electrons and the protons. The cathode is provided with air through the separators 16. The cathode is also composed of a catalyst layer for transforming the oxygen in air into electrons and oxygen ions through a reduction reaction, and a gas diffusion layer for free transfer of the electrons and the oxygen ions. The electrolyte membrane is a solid polymer electrolyte having a thickness of 50 to 200 μm. The electrolyte membrane carries out a function of transferring the protons generated in the catalyst layer of the anode to the catalyst layer of the cathode.

The separators 16 function as a conductor that couples the anode and the cathode of the MEA 12 in series. The separators 16 also function as a path for supplying the reformed gas and air needed for the oxidation/reduction reaction of the MEA 12 to the anode and the cathode. To function as a path, the separators 16 have a flow path channel 17 for supplying the gas required for the oxidation/reduction reaction at the MEA 12 to the surface of the MEA.

More specifically, the separators 16 are placed on both sides of the MEA 12 and tightly contact and press against the anode and the cathode of the MEA 12. The separators 16 have a flow path channel 17 on the contact surfaces to the anode and the cathode, for providing the reformed gas to the anode and the air to the cathode.

Each end plate 13 is positioned at one end of the stack 10 and while functioning as a separator 16 for its corresponding power generating unit 11, also functions as a fastener for the multiple power generating units 11. Each end plate 13 can tightly contact and press against any one of the anode and the cathode of an adjacent MEA 12. Flow path channels 17 are also formed on one side of the end plates 13. On the contact surface of the end plate 13 at one end of the stack 10 with an adjacent MEA 12, the flow path channel 17 can supply the reformed gas or the air to any one of the two electrodes. Also, on the contact surface of the other end plate 13 at the other end of the stack 10 with its adjacent MEA 12, the flow path channel 17 formed on the end plate 13 can supply the hydrogen gas or air to either of the two electrodes.

In addition, the end plate 13 includes a first supply line 13a, a second supply line 13b, a first discharge line 13c, and a second discharge line 13d. Hydrogen gas generated in the reformer 30 is introduced into one of the flow path channels 17 through the first supply line 13a. Air is introduced into another one of the flow path channels 17 through the second supply line 13b. Hydrogen gas that was not used in the reaction and is left behind in the power generating units 11 is discharged through the first discharge line 13c. Air which was not used in the reaction and is left behind in the power generating units 11 is discharged through the second discharge line.

As shown in FIG. 2, and as described above, the first supply line 13a is coupled to the second carbon monoxide remover 34 of the reformer 30 through the fifth supply line 85, and the second supply line 13b is coupled to the air supplier 70 through the sixth supply line 86 for supplying the air.

During the operation of the fuel cell system 100, first the liquid-phase fuel stored in the first tank 51 is supplied to the heat source 31 through the first supply line 81 by operating the fuel pump 55. At the same time, air is supplied to the heat source 31 through the second supply line 82 by operating the air pump 71. Then, the liquid-phase fuel and the air flow through the flow path channel 31c of the heat source 31 to induce an oxidation/reduction reaction. Through the catalytic oxidation reaction, the heat source 31 generates reaction heat of a predetermined temperature. The heat energy generated in the heat source 31 is transferred to the reforming reactor 32 and the first and second carbon monoxide removers 33, 34 to preheat the entire reformer 30.

After the reformer 30 is preheated, the fuel pump 55 is operated to provide the liquid-phase fuel stored in the first tank 51 and water stored in the second tank 53 to the reforming reactor 32 through the third supply line 83.

Subsequently, the mixture of the liquid-phase fuel and water is evaporated by the heat provided from the heat source 31, while the mixture flows through the flow path channel 32c of the reforming reactor 32. Then, the reforming reactor 32 generates hydrogen gas from the evaporated mixed fuel through a SR catalytic reaction. Additionally, the reforming reactor 32 generates the hydrogen gas containing carbon monoxide and hydrogen by simultaneously carrying out a decomposition reaction of the mixed fuel and a deformation reaction of carbon monoxide through a SR catalytic reaction. Because the reforming reactor 32 cannot perform the reforming reaction of carbon monoxide perfectly, it generates hydrogen gas containing a minute quantity of carbon monoxide as a byproduct.

The hydrogen gas containing a minute quantity of carbon monoxide flows through the flow path channel 33c of the first carbon monoxide remover 33. The first carbon monoxide remover 33 generates hydrogen gas additionally through the WGS catalytic reaction and primarily reduces the concentration of the carbon monoxide included with the hydrogen gas.

Subsequently, the hydrogen gas that has passed through the flow path channel 33c of the first carbon monoxide remover 33 flows through the flow path channel 34c of the second carbon monoxide remover 34. At the same time, the air pump 71 is operated to provide the air to the flow path channel 34c of the second carbon monoxide remover 34 through the fourth supply line 84. The second carbon monoxide remover 34 secondarily reduces the concentration of the carbon monoxide included in the hydrogen gas through a preferential carbon monoxide oxidation catalytic reaction and discharges the hydrogen gas through the outlet 34g.

The discharged hydrogen gas is supplied to the first supply line 13a of the stack 10 through the fifth supply line 85. At the same time, the air pump 71 is operated to provide air to the second supply line 13b of the stack 10 through the sixth supply line 86.

The hydrogen gas is supplied to the anode of the MEA 12 through the hydrogen path of the separators 16. The air is supplied to the cathode of the MEA 12 through the air path of the separators 16.

At the anode, the hydrogen gas is decomposed into electrons and protons through an oxidation reaction. The protons are transferred to the cathode through the electrolyte membrane, and the electrons which cannot be transferred through the electrolyte membrane are transferred to the anode of a neighboring membrane electrolyte assembly 12 through the separators 16. The flow of the electrons generates an electric current and additionally generates heat and water.

One exemplary embodiment of the reformer 30 is described above. However, the structure of the reformer is not limited to the stack-type structure which is described above. For example, the reformer may also have a cylindrical form. If the reformer including the heat source and the reforming reactor has a rectangular plate shape having a predetermined length, width, and thickness, the stack-type structure is preferred. On the other hand, if the reformer has the shape of a circular tube, a cylindrical structure is preferred.

The present invention uses an alloy of a barrier layer forming metal and a mechanical strength enhancing metal to form the reformer of a fuel cell system. Therefore, the reformer has improved welding characteristics compared to a reformer formed from pure Al. By forming an oxide film, the alloy also has improved adhesion to a catalyst.

While exemplary embodiments of the invention have been described, it is to be understood by those skilled in the art that the invention is not limited to the disclosed exemplary embodiments; rather, it is intended to cover various modifications included within the spirit and scope of the appended claims and equivalents thereof.

What is claimed is:

1. A reformer for a fuel cell adapted to generate a hydrogen-rich reformed gas from a mixed fuel comprising water and a fuel including hydrogen, the reformer comprising:
    a heat source adapted to evaporate the mixed fuel, the heat source having a heat source flow path through which the mixed fuel passes, the heat source flow path having a predetermined length and a first catalyst layer lining an internal surface of the heat source flow path;
    a reforming reactor adapted to generate the hydrogen-rich reformed gas from the mixed fuel, the reforming reactor having a reforming reactor flow path through which the mixed fuel passes, the reforming reactor flow path having a predetermined length and a reforming catalyst layer lining an internal surface of the reforming reactor flow path; and
    a carbon monoxide remover coupled with the reforming reactor flow path and adapted to remove carbon monoxide from the reformed gas,
    wherein the heat source, the reforming reactor, and the carbon monoxide remover are welded together to form an integrated structure, the carbon monoxide remover comprising two plates with the heat source and the reforming reactor located therebetween,
    wherein at least one of the heat source or the reforming reactor consists essentially of an alloy of a barrier layer forming metal and a mechanical strength enhancing metal, and each of the heat source and the reforming reactor has a serpentine path comprising a plurality of parallel channels in a same plane to form the heat source flow path or the reforming reactor flow path, such that the heat source flow path and the reforming reactor flow path are respectively formed in different planes that are parallel to each other, and
    wherein the barrier layer forming metal consists essentially of a material selected from the group consisting of Al, Ti, Zn, Zr, and combinations thereof and the mechanical strength enhancing metal consists essentially of a material selected from the group consisting of Fe, Ni, Mn, Mg, and combinations thereof.

2. The reformer of claim 1, wherein the barrier layer forming metal and the mechanical strength enhancing metal are provided in a weight ratio from 10:90 to 90:10.

3. The reformer of claim 2, wherein the alloy of the barrier layer forming metal and the mechanical strength enhancing metal is an alloy of Al and Fe.

4. The reformer of claim 1, wherein the reforming reactor flow path includes an inlet for receiving the mixed fuel, and an outlet for producing the reformed gas.

5. The reformer of claim 1, wherein the reformer is a stacked structure or a cylindrical structure.

6. The reformer of claim 1, wherein the heat source flow path and the reforming reactor flow path each comprise an amorphous oxide catalyst supporting layer.

7. The reformer of claim 1, wherein the heat source further comprises a heating unit thermally coupled with the heat source flow path adapted to heat the flow path.

8. The reformer of claim 1, wherein the carbon monoxide remover comprises a carbon monoxide removing flow path defined by a plurality of surrounding walls lined with a carbon monoxide removing catalyst.

9. A reformer for a fuel cell adapted to generate a hydrogen-rich reformed gas from a mixed fuel comprising water and a fuel including hydrogen, the reformer comprising:
    a heat source adapted to evaporate the mixed fuel, the heat source having a heat source flow path through which the mixed fuel passes, the heat source flow path having a predetermined length and a first catalyst layer lining an internal surface of the heat source flow path;
    a reforming reactor adapted to generate hydrogen gas from the mixed fuel, the reforming reactor having a reforming reactor flow path through which the mixed fuel passes, the reforming reactor flow path having a predetermined length and a reforming catalyst layer lining an internal surface of the reforming reactor flow path; and
    a carbon monoxide remover coupled with the reforming reactor flow path and adapted to remove carbon monoxide from the reformed gas, the carbon monoxide remover comprising two plates with the heat source and the reforming reactor located therebetween, and
    wherein at least one of the heat source and the reforming reactor is formed of an alloy of a barrier layer forming metal and a mechanical strength enhancing metal.

* * * * *